Sept. 30, 1924. 1,510,200
J. B. WATSON
ADJUSTABLE HEADLIGHT
Filed Feb. 14, 1924 2 Sheets-Sheet 1
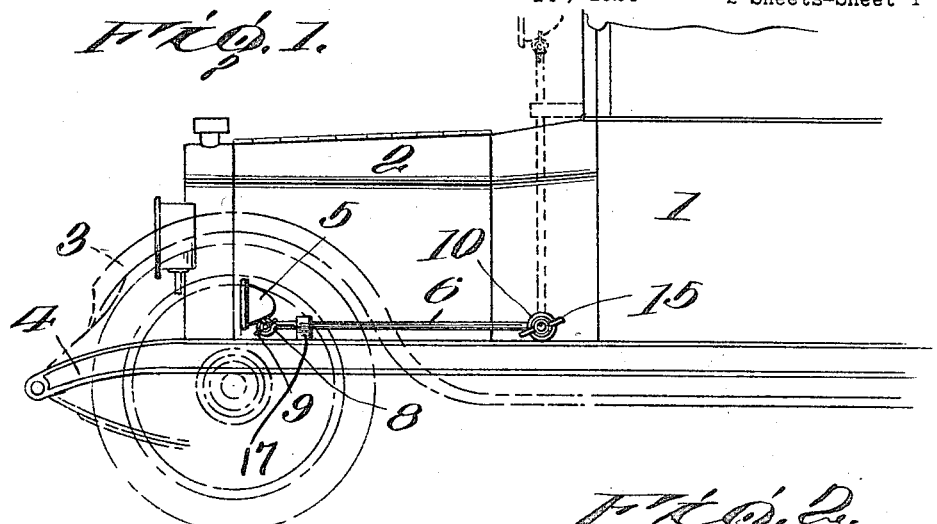
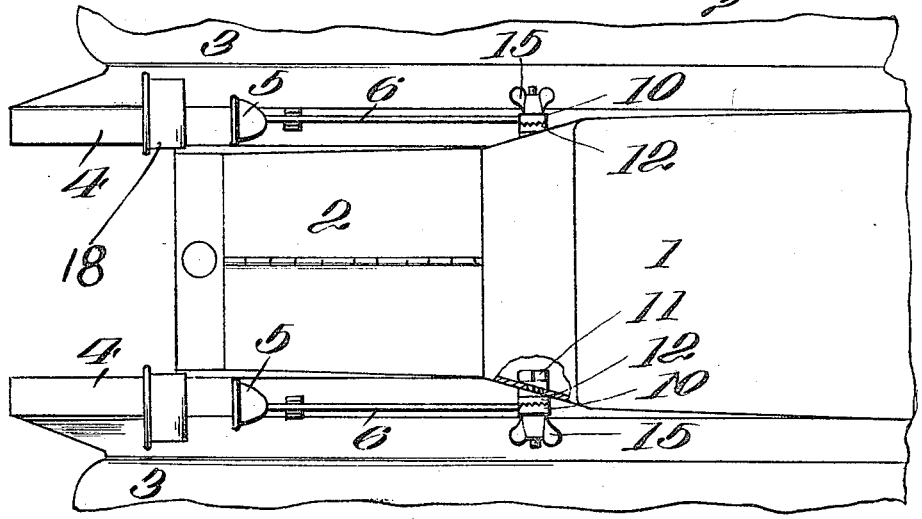
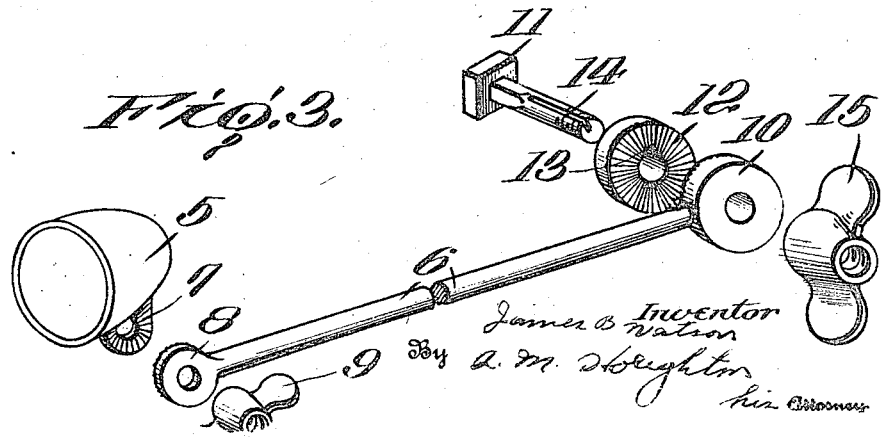

Sept. 30, 1924.  J. B. WATSON  1,510,200
ADJUSTABLE HEADLIGHT
Filed Feb. 14, 1924    2 Sheets-Sheet 2
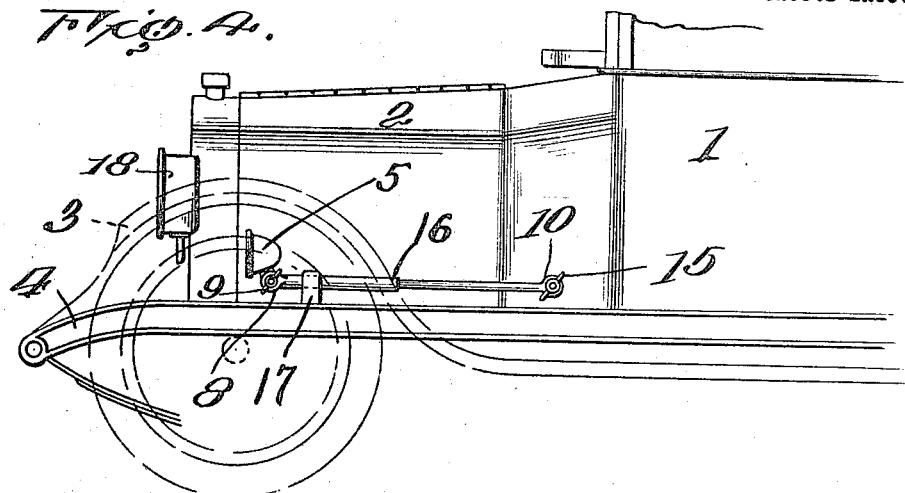
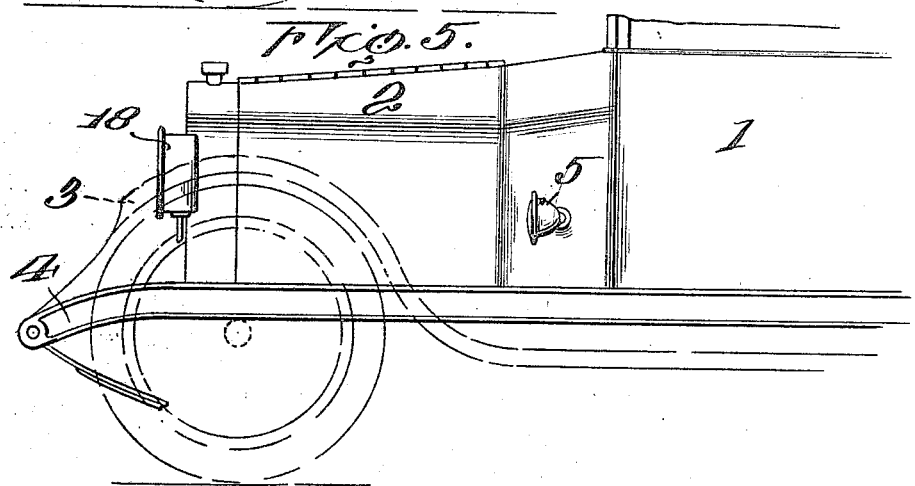
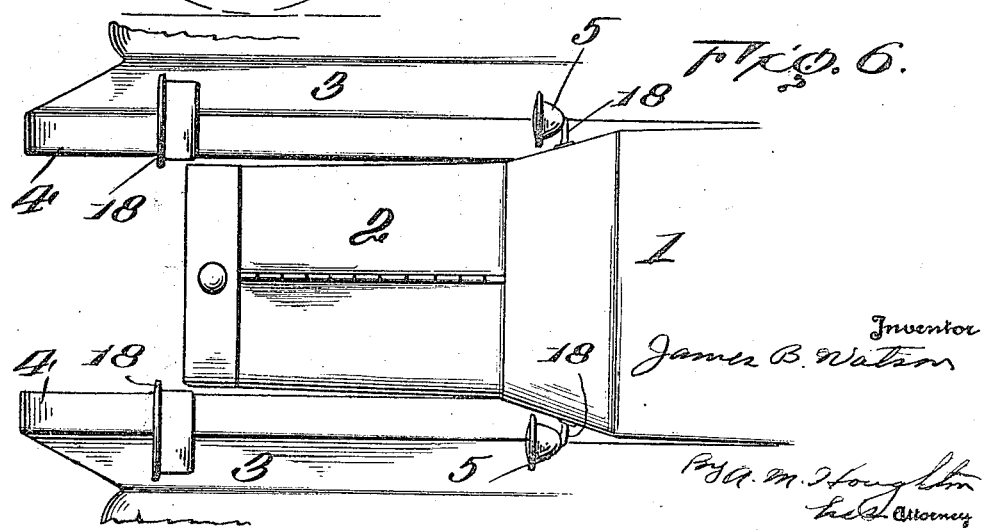
Inventor
James B. Watson
By A. M. Houghton
His Attorney Patented Sept. 30, 1924.

1,510,200

UNITED STATES PATENT OFFICE.

JAMES B. WATSON, OF THURSTON, OHIO.

ADJUSTABLE HEADLIGHT.

Application filed February 14, 1924. Serial No. 692,783.

*To all whom it may concern:*

Be it known that I, JAMES B. WATSON, a citizen of the United States, residing at Thurston, in the county of Fairfield and State of Ohio, have invented certain new and useful Improvements in Adjustable Headlights, of which the following is a specification.

This invention relates to headlights for automobiles and it comprises in combination with a motor vehicle a headlight positioned relative to the body of the vehicle so that parts of the body act to direct the light forwardly and to shield the rays of light against sidewise disbursement; all as more fully hereinafter set forth and as claimed.

The present invention is particularly adapted for use on motor vehicles and has for its object the provision of lamp structure advantageously pivotally mounted upon a body of an automobile and mounted in position or capable of being moved in position between the hood and the fender so that the rays of light are directed by the hood and fender to eliminate diffusion and the consequent glare in the eyes of a driver or a pedestrian traveling in the direction opposite to that of travel of the automobile. Another object of the invention is the provision of a light of the character described which may be used as a headlight, a spot light, or a trouble lamp for examining the engine of an automobile. Another object of the invention is the provision of a light such as described which may be positioned back of the usual head lamp of an automobile so that these lamps may act as shields for the rays from said light.

In the accompanying drawings, Fig. 1 is a side view partly in section of a frame and body of an automobile showing one form of lamp within the present invention;

Fig. 2 is a top plan view showing the use of the lamps at either side of the body of an automobile and means to fasten the lamps in adjusted position;

Fig. 3 is a detailed disassembled perspective of the arm upon which the lamp is mounted and the means for locking the lamp in adjusted position;

Fig. 4 is a side elevation showing a somewhat modified form;

Fig. 5 is a side elevation of a still further modification; and

Fig. 6 is a top plan view of Fig. 5.

Referring to the drawings:

The numeral 1 indicates the body of an automobile provided with a hood 2 and fenders 3, the whole being mounted upon a chassis 4.

A lamp 5, of the type commonly known as a spot light, is mounted for adjustment on the end of arm 6, said adjustment being obtained by a toothed ear 7 cooperating with an enlarged and similarly toothed portion 8 of arm 6. Adjustment is obtained by a screw-threaded bolt, not shown, and a wing nut 9 shown in detail in Figure 3 of the drawing. Permanently attached to the opposite end of arm 6 is a member 10 formed with a central opening for the reception of bolt 11, said member having its face serrated as shown in Figure 3. A corresponding member 12 has a toothed face for cooperation with the like face of member 10, and is provided with a central opening and key slot 13 for cooperation with key 14 in the shank of bolt 11. Fixed adjustment is maintained by wing nut 15 threading upon bolt 11.

The arm 6 is adapted to be swung to upright position as shown in dotted lines, Figure 1, and in this position serves as a spot light.

Much difficulty has been experienced in driving at night due to the glare from headlights of oncoming vehicles. The present invention is designed primarily to obviate this objection. This is accomplished by making the arm 6 of such length that, when in lower position, as shown in full lines in Figure 1, the lamp 5 will lie between, and will be shielded by the hood 2 and fender 3 of the vehicle to which it is attached. Inasmuch as the lamp 5 is positioned adjucent the frame of the vehicle and considerably lower than the ordinary headlight structure the rays of light therefrom will be in a line considerably below the line of direct vision of the operator of an approaching vehicle. Furthermore, such position is even more advantageous inasmuch as diffusion of the light from lamp 5 is largely eliminated, the light being directed by the hood and fender of the vehicle. It is well known that the blinding glare of headlights is caused by a direct view of the reflector. By so positioning the lamp that the reflector cannot be seen except in very limited positions the annoyance of glare is disposed of yet, at the same time, there is ample sufficiency of light for driving.

It is to be understood that the structure above described is preferably duplicated, that is, adjustable lamps are mounted on both sides of the vehicle between the hood and fenders.

In Fig. 4 is shown a slight modification in which the arm 6 is provided with a slidably mounted sleeve 16 to which the lamp 5 may be attached as described. The rest 17 in which the arm 6 or the arm 16 may fit prevents vibration of the auxiliary light. Through this arrangement and the arrangement described with respect to Figs. 1, 2 and 3 the lamp may be positioned at any point so that it may be used either as a spot lamp above the hood of an automobile or as an auxiliary light shielded by the mud guards and the hood and directing the rays of light below the normal level of the usual head light.

In Figs. 5 and 6 is shown another modified form of the invention in which the lamps 5 are permanently mounted by means of brackets 18 in a position so that the rays of light are directed between the mud guards and the hood and below head light 18.

The auxiliary lights described will illuminate the road from 40 to 60 feet ahead of the automobile with the rays of light so shielded by the hood, mud guards and usual headlights that there is no blinding effect upon an approaching driver.

If the head lights are not sufficient additional shields in the path of the rays of light from the auxiliary light may be used attached either to the usual head lights or the automobile.

What I claim is:—

An auxiliary light structure for motor vehicles comprising a lamp, an arm to one end of which said lamp is attached, said arm being pivotally secured to the body of said vehicle at its other end and means for holding said arm and light in a horizontal position between the hood and fender, below and at the rear of the headlight whereby the headlight, hood and fenders serve to direct the rays from the auxiliary light so as to eliminate diffusion and the consequent glare in the eyes of the driver of an oncoming machine.

In testimony whereof, I have hereunto affixed my signature.

JAMES B. WATSON.